United States Patent [19]

Sweitzer

[11] 4,291,425

[45] Sep. 29, 1981

[54] SOCKET WRENCH

[76] Inventor: John D. Sweitzer, 9323 Sweet Brush, Houston, Tex. 77064

[21] Appl. No.: 128,947

[22] Filed: Mar. 10, 1980

[51] Int. Cl.³ .......................... B25F 1/00; B25G 1/00
[52] U.S. Cl. ...................................... 7/100; 81/177 B
[58] Field of Search ................ 7/100, 138; 81/177 R, 81/177 B

[56] References Cited

U.S. PATENT DOCUMENTS

| | | | |
|---|---|---|---|
| 2,701,707 | 2/1955 | Miller | 7/100 X |
| 3,587,366 | 6/1971 | Klein | 81/177 B |
| 3,649,976 | 3/1972 | Isom | 81/177 B X |
| 3,779,106 | 12/1973 | Cavicchi | 81/177 B |
| 3,973,283 | 8/1976 | Boe | 7/100 |
| 4,070,931 | 1/1978 | Florko, Jr. | 81/177 B |

*Primary Examiner*—James G. Smith
*Attorney, Agent, or Firm*—Neal J. Mosely

[57] ABSTRACT

A cross or X-type socket wrench comprises a longitudinally extending shaft with socket wrenches at opposite ends thereof and a pair of shafts extending laterally from the central portion thereof. The laterally extending shafts extend at an obtuse angle to each other in a plane extending at a right angle to the longitudinal axis of the socket shaft and having pedal steps at the outer ends thereof. In the preferred embodiment the outer ends of the laterally extending shafts are rebent in a direction opposite to the obtuse angle of the shafts so that the weight of the rebent ends and the pedal steps supported thereon are located to maintain the center of gravity thereof on a line extending through the longitudinal axis of the socket shaft. The end of one of the pedal steps is sharpened and bent to provide a claw for removal of automobile hubcaps. In an alternate embodiment, the socket wrenches are removably supported on the ends of the socket shaft.

6 Claims, 3 Drawing Figures

SOCKET WRENCH

BACKGROUND OF THE INVENTION

1. Field of the Invention

This invention relates to new and useful improvements in cross or X-type socket wrenches which are particularly useful in the removal of hubcaps and nuts from automobiles for changing tires.

2. Brief Description of the Prior Art

Lug wrenches for automobiles of cross or X-type are well known in the prior art and have been in use for many years. Such wrenches usual have shafts which are formed in a cross or X-shape with socket wrenches integrally formed in the ends of two or more of the shafts and at least one shaft having a claw for removal of the hubcap. Wrenches of this type are in common use but are often difficult to use by women or men who are not particularly strong. The prior art discloses several attempts to provide an improved automobile lug wrench construction.

Torgerson U.S. Pat. No. 1,710,198 discloses a speed wrench of a cross or X-type construction having a socket and having the cross bar rotatable on the shaft which carries the socket. The rotatable bar or shaft has counter weights on its outer ends to provide improved torque and speed in operation.

Ronning U.S. Pat. No. 2,313,398 discloses a cross or X-type automobile lug wrench having removable sockets on the ends of the main shaft and having a removable cross shaft, the ends of which have enlarged hand gripping portions.

Davis U.S. Pat. No. 3,799,011 discloses an automobile lug wrench having cross members which extend in a V in the same plane as the main shaft. The V-members have end portions for receiving an impact blow by a hammer or the like.

Boe U.S. Pat. No. 3,973,283 discloses an automobile lug wrench having a single operating shaft extending at a right angle to the socket wrench carried thereon and having a pedal step at the outer end of the operating shaft.

Florko U.S. Pat. No. 4,070,931 discloses an automobile lug wrench having a bifurcated shaft extending from the lug socket shaft and a fulcrum member removably positioned on one branch of said bifurcated shaft and rotatable against the other branch of said shaft for applying an impact load and for turning the socket wrench.

Various automobile lug wrenches of the prior art are either too expensive and complicated to build or provide inadequate means for application of force by a woman or man of lesser strength.

SUMMARY OF THE INVENTION

This invention comprises a new and improved automobile lug wrench in the form of a cross or X-type socket wrench constructed to be easily operated by a woman or man of lesser strength. The wrench comprises a longitudinally extending shaft having socket wrenches in the opposite ends thereof and a pair of shafts extending from and secured in a fixed position on the socket shaft at a point intermediate said socket wrenches. The pair of shafts each have a pedal step at the outer end thereof and on the same side thereof whereby stepping on one pedal step will rotate the socket shaft in one direction and stepping on the other pedal step will rotate the socket shaft in the opposite direction. The pair of shafts are preferably extending at an obtuse angle relative to each other and in a plane extending at a right angle to the longitudinal axis of the socket shaft. The ends of the angled shafts are rebent and carry the pedal steps on the rebent portions. The shafts which are angled and the rebent portions thereof carrying said pedal steps are proportioned so that the center of gravity of the pedal step-carrying shafts is on a line extending through the longitudinal axis of the socket shaft. The pedal steps preferably have a claw member at the end of each of at least one step which is usable to remove automobile hubcaps. The socket shaft may have the socket wrenches fixed thereon or may have removable socket wrenches providing for a variety of socket sizes.

DESCRIPTION OF THE PREFERRED EMBODIMENT

Figure 1:
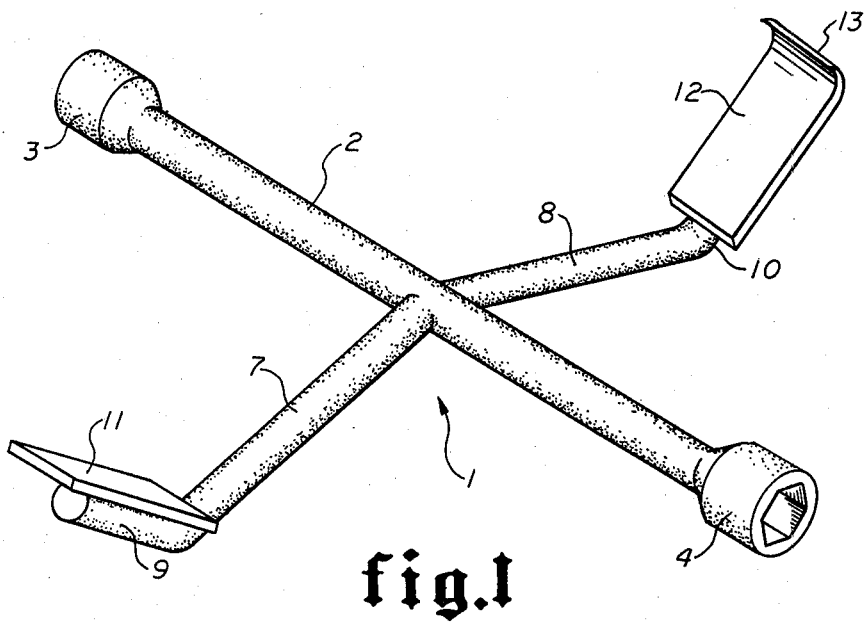
FIG. 1 is an isometric view of an automobile lug wrench comprising a cross or X-type socket wrench representing a preferred embodiment of this invention.
Figure 2:
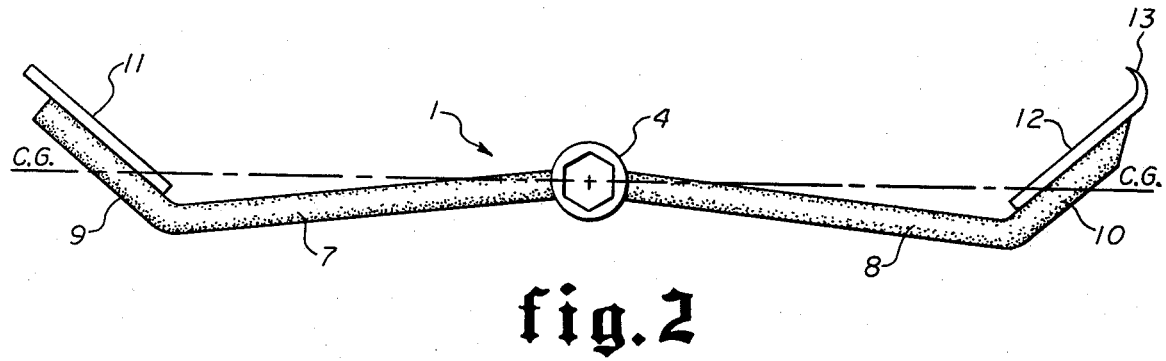
FIG. 2 is an end view of the wrench shown in FIG. 1.
Figure 3:
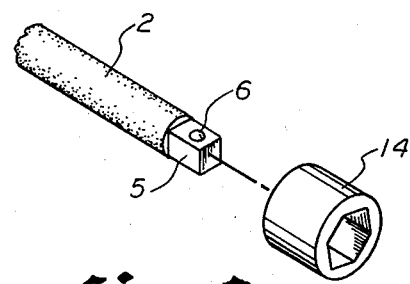
FIG. 3 is a detail isometric view of one end of an alternate embodiment of the wrench shown in FIG. 1 in which the socket wrench is removable from the socket shaft.

In FIGS. 1 and 2 of the drawings, there is shown a preferred embodiment of automobile lug wrench 1 in the form of a cross or X-type socket wrench of novel construction. Wrench 1 comprises longitudinally extending shaft 2 having socket wrenches 3 and 4 on opposite ends thereof. In FIG. 3, one end of shaft 2 has a reduced portion 5 with ball connector 6 for securing a removable socket wrench 14 in place. The wrench structure shown can have either socket wrenches 3 and 4 which are integral with and secured on shaft 2 or one or more of which is removable as shown in FIG. 3.

A pair of shafts 7 and 8 extend from and are secured in a fixed position on socket shaft 2. The outer ends of shafts 7 and 8 are rebent as indicated at 9 and 10, respectively. The outer end portions 9 and 10 have pedal steps 11 and 12 supported thereon. The outer end of at least one of the pedal steps is provided with a claw portion 13 for removing automobile hubcaps.

Shafts 7 and 8 extending laterally on opposite sides of socket shaft 2 extend in an obtuse angle relative to each other and in a plane extending at a right angle to the longitudinal axis of shaft 2 as seen in FIGS. 1 and 2. The rebent end portions 9 and 10 and pedal steps 11 and 12 extend in the opposite direction toward the center line through the wrench so that the wrench has a W-shape in end view. The shafts 7 and 8 and rebent end portions 9 and 10 and pedal steps 11 and 12 supported thereon are proportioned so that the center of gravity of shafts 7 and 8 passes through the longitudinal axis of socket shaft 2 when the wrench is supported on socket shaft 2. As a result of this construction, when the wrench is supported on socket shaft 2, as when one of the socket wrenches is on a lug nut, there is no unbalanced position at any point in the rotation of shafts 7 and 8 around the longitudinal axis of socket shaft 2.

In the construction shown, pedal steps 11 and 12 are both on the same side of shafts 7 and 8, respectively, so that stepping on one of the pedal steps will rotate socket shaft 2 in one direction and stepping on the other pedal step will rotate socket shaft 2 in the opposite direction. This wrench is constructed so that the claw portion 13 can be used to remove automobile hubcaps. When one of the wrench sockets is positioned on an automobile lug nut, the person using the wrench can step on the pedal step which will rotate the socket shaft 2 and the wrench socket and lug nut positioned therein in a direction loosening the nut. The person using the wrench may apply his or her weight to the pedal step, either by a continuous application of weight or by a shock or impact application of weight. This construction permits even a light weight person of lesser strength to use the tool to loosen or tighten an automobile lug nut even where the nut is over tightly secured as in the case of rusting. The pedal step opposite to the one used for loosening the nut is used in the final tightening of a nut reassembly of the lug nut on the automobile axle. The arrangement of arms or shafts 7 and 8 and rebent end portions 9 and 10 and pedal steps 11 and 12 which causes the center of gravity of those arms or shafts to pass through the longitudinal axis of socket shaft 2 results in the wrench having no tendency to turn to one side or the other when supported for free rotation. As a result, when the wrench is applied to loosen an automobile lug nut and one of the pedals is stepped on to provide the initial loosening, shaft 2 may then rotated rapidly or spun to provide a rapid removal of the lug nut from its threaded connection. Likewise, when the wrench is used to reassemble nuts on their threaded connectors the tool will spin freely, without any unbalance, for rapid positioning of the lug nut in place prior to use of the appropriate pedal step for the final tightening operation.

While this invention has been described fully and completely with special emphasis upon a single preferred embodiment, it should be understood that within the scope of the appended claims the invention may be practiced otherwise than as specifically described and shown herein.

I claim:

1. A cross or X-type socket wrench comprising
    a longitudinally extending shaft having socket wrenches in the opposite ends thereof,
    a pair of shafts, each extending at a right angle from and rigidly secured in a fixed position, on said socket shaft at a point intermediate said socket wrenches, and
    said pair of shafts each having a pedal step secured at the outer end portion thereof and on the same side thereof whereby stepping on one pedal step will rotate said socket shaft in one direction and stepping on the other pedal step will rotate the same in the opposite direction.
2. A socket wrench according to claim 1 in which
    said pair of shafts extend at an obtuse angle relative to each other and in a plane extending at a right angle to the longitudinal axis of said socket shaft.
3. A socket wrench according to claim 1 or 2 in which
    said pair of shafts are shaped so that the center of gravity thereof is on a line extending through the longitudinal axis of said socket shaft.
4. A socket wrench according to claim 2 in which
    the outer ends of said pair of shafts are rebent and said pedal steps are supported on said rebent ends in a position such that the center of gravity thereof is on a line extending through the longitudinal axis of said socket shaft.
5. A socket wrench according to claims 1, 2 or 4 in which
    said socket wrenches are removably supported on the ends of said socket shaft.
6. A socket wrench according to claim 1 in which
    one of said pedal steps is shaped at its outer end as a claw for removal of automobile hubcaps.

* * * * *